(No Model.)
W. B. MASON.
COMBINED REDUCING VALVE AND STEAM TRAP.
No. 551,778. Patented Dec. 24, 1895.
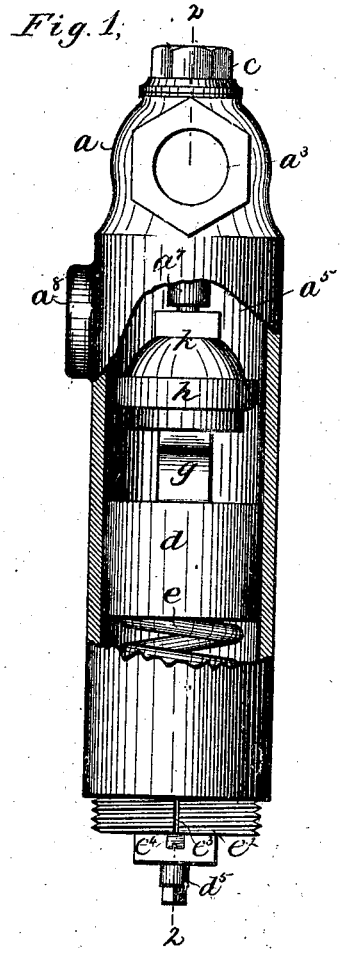
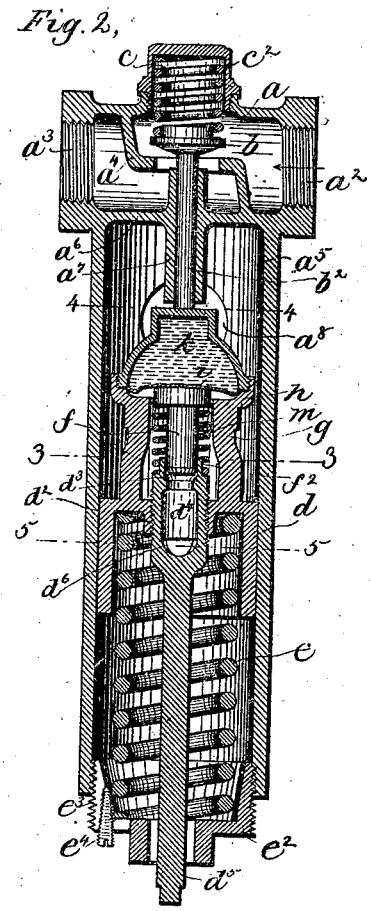
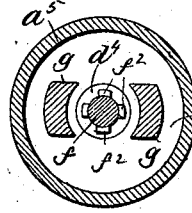
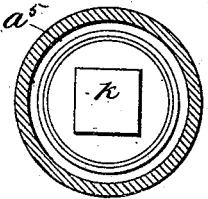
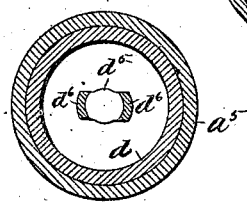
Witnesses,
Jas. J. Maloney.
M. E. Hill.
Inventor,
William B. Mason,
by Jo. P. Livermore
Att'y.

UNITED STATES PATENT OFFICE.

WILLIAM B. MASON, OF BOSTON, MASSACHUSETTS, ASSIGNOR TO THE MASON REGULATOR COMPANY, OF SAME PLACE.

COMBINED REDUCING-VALVE AND STEAM-TRAP.

SPECIFICATION forming part of Letters Patent No. 551,778, dated December 24, 1895.

Application filed February 25, 1889. Serial No. 301,100. (No model.)

*To all whom it may concern:*

Be it known that I, WILLIAM B. MASON, of Boston, county of Suffolk, and State of Massachusetts, have invented an Improvement in a Combined Reducing-Valve and Steam-Trap, of which the following description, in connection with the accompanying drawings, is a specification, like letters on the drawings representing like parts.

The object of my invention is to produce a single instrument containing a pressure-regulator or reducing-valve by which steam or other fluid is delivered at a substantially uniform pressure at the outlet of the valve, which pressure is lower than that of the steam or fluid supplied to the valve, said instrument also comprising a trap by which water of condensation or other liquid is discharged from the system of pipes or space supplied by said reducing-valve without permitting the escape of uncondensed fluid or steam.

For the purpose of enabling the invention to be more readily understood it may be stated that the instrument forming the subject of this invention is adapted to be used in connection with steam heating apparatus such as employed on railway-cars, although the invention is not limited to such use, but is applicable to any case where it is desirable to perform the functions of a reducing-valve and steam-trap in one apparatus.

When applied to railway-car heating, the cars are provided with a main steam-supply pipe extending from the locomotive and thence directly from one to another of the cars of the train, and the steam is commonly delivered to the said supply-pipe from the locomotive-boiler through a reducing-valve which diminishes the pressure considerably below the boiler-pressure, but still leaves it much higher than required for heating purposes, it being, for example, admitted to said supply-pipe and retained therein at a pressure of about forty pounds to the inch.

The instrument forming the subject of this invention is interposed between the said supply-pipe and the radiating or heating pipes within the cars or spaces to be heated, and the reducing-valve of the instrument operates to deliver the steam into the said radiators at a suitable pressure for heating purposes—for example, at about five pounds to the inch above the atmospheric pressure. The drip-pipe or collector for the water of condensation from said radiating-pipes also communicates with the instrument forming the subject of this invention, which is provided with a collecting-chamber or reservoir and means for discharging the water therefrom without permitting the escape of uncondensed steam, said function being performed without interfering with the operation of the reducing-valve.

Figure 1 is a side elevation of a combined reducing-valve and trap embodying this invention; Fig. 2, a longitudinal section thereof on line 2 2 of Fig. 1; and Figs. 3, 4, and 5, transverse sections on lines 3, 4, and 5, respectively, of Fig. 2.

The instrument comprises a valve-chamber $a$, having inlet and outlet openings $a^2 a^3$, separated by a partition $a^4$, having an opening and valve-seat controlled by the main valve proper $b$, which works in the inlet side of the valve-chamber and is thus exposed at its upper side to the pressure of the supplied steam which tends to force the said valve to its seat. It is shown as also provided with a light spring $c$, contained in a removable bonnet or cap $c^2$ at the upper part of the valve, which spring tends to move the valve toward its seat.

The valve body or shell $a$ is provided with a reservoir or collecting-chamber $a^5$ below the inlet and outlet portions of said valve and preferably separated therefrom by a partition $a^6$, although the said reservoir $a^5$ might communicate with the outlet portion of the main valve-chamber without materially changing the operation of the instrument. The said partition $a^6$, or a portion of the main body or shell of the apparatus below the outlet portion of the valve, is provided with a guide $a^7$ for the stem $b^2$ of the valve $b$, which may fit loosely in said guide so as to work easily as there is no necessity of maintaining a tight division between the outlet portion of the valve and the reservoir $a^5$. The said reservoir $a^5$ may be, as shown, made integral or cast in one piece with the body of the valve and the valve-shell proper and reservoir practically form a single shell or body for containing the working parts, and said reservoir $a^5$ is made as a cylinder to co-operate with a piston $d$, which, as will hereinafter appear, may have an easy fit in the said cylinder and does not require packing. The said piston $d$ is of larger area than the valve $b$, and said piston or a rigid extension thereof acts on the stem $b^2$ of the main valve $b$, so that upward force applied to the piston $d$ is transmitted through the stem $b^2$ to the valve $b$, with a tendency to lift the latter off from its seat, while downward movement of the piston $d$ permits the valve $b$ to move toward its seat under the action of the pressure exerted upon it both by the fluid entering the valve and by the spring $c$.

The reservoir $a^5$ is provided at a point above the piston $d$ with an inlet $a^8$, which communicates with the system of radiating-pipes or whatever other space is supplied with the steam that passes through the main reducing-valve, and the entire instrument is located at such a level that the passage $a^8$ constitutes a drip-passage or receives the liquid formed by the condensation of the fluid which has passed through the reducing-valve so that said liquid enters the reservoir $a^5$ above the piston $d$, which is exposed at its upper surface to the pressure of the fluid at the outlet side of the main valve and is adapted to be moved downward as said pressure increases.

The piston $d$ is acted upon at its under side by a spring $e$, which exerts sufficient force to overcome the maximum pressure that may be applied at the inlet side of the valve to the main valve $b$, so that when there is no downward force acting on the upper side of the piston $d$ the spring $e$ will raise the same and also raise the valve $b$ off from its seat sufficiently to afford the full or maximum opening required for the valve, so that the fluid will be permitted to flow through the said valve into the radiators or spaces supplied by said valve, and as the pressure rises in said radiators, owing to the continued admission of fluid from the supply-pipe, it will act upon the upper surface of the valve $b$, tending to oppose the force of the spring $e$, which will be so adjusted that when the pressure rises to the desired maximum amount in the supplied space the said spring will be compressed far enough to permit the valve $b$ to close, and thus cut off further admission of fluid until the pressure in the supplied space falls below the desired predetermined or normal amount.

As the area of the piston $d$ is considerably greater than that of the valve $b$, a much smaller pressure to the square inch in the supplied passages is effective to overcome the spring $e$ than is required in the supply-passages to overcome said spring $e$ by pressure on the main valve $b$, and consequently while the said spring $e$ may be adequate to open the main valve $b$ against a pressure upon it of considerably more than the normal pressure of forty pounds, when a pressure of five pounds is applied to the upper side of the piston $d$ it will, in conjunction with the pressure on the valve $b$, be sufficient to compress the spring $e$ so as to permit the closing of the main valve sufficiently to prevent further rise in pressure at the outlet side of the main valve.

The force of the spring $p$ may be regulated and adjusted so as to maintain the desired pressure in the receiving-pipes by means of a movable head or follower $e^2$ which forms the support for the lower end of the spring and screws into the lower end of the chamber $a^5$. In order to fasten the said follower when properly adjusted it is split radially at one side, as shown at $e^3$, and provided with a tapering threaded passage into which is screwed a tapering screw $e^4$, which expands the follower slightly after it has been adjusted so as to lock it against unscrewing in the end of the chamber $a^5$.

The parts thus far described would operate as a reducing-valve independently of any function of the apparatus as a trap, it being necessary only that the stem $b^2$ of the main valve should rest against the upper side of the piston $d$ or a suitable extension thereof.

In order to provide for the operation as a trap to discharge water of condensation from the supplied space without permitting the escape of steam, the said piston $d$ is provided with a central opening $d^2$, which contains a valve-seat $d^3$, shown as made in the end of a tubular piece or thimble $d^4$, that screws into the said passage $d$, and has a stem $d^5$ that extends down through a central opening in the head $e^2$ that supports the spring $e$ and is provided with a suitable wrench-head or other means to enable it to be turned for the purpose of adjusting the said piece $d^4$ in the piston for the purpose that will be hereinafter explained.

The tubular piece $d^4$ is connected with the stem $d^5$ by arms $d^6$ (see Fig. 5) so as to afford a passage from the interior of the thimble $d^3$ into the portion of the chamber $a^5$ that contains the spring $e$, which may be called the "spring-chamber," and there is a sufficient opening in the head $e^2$, around the stem $d^5$, to permit the escape of any liquid that may flow down into the space below the piston $d$. The passage through and below the valve-seat $d^3$ thus constitutes an outlet-passage from the trap reservoir or chamber $a^5$, and said outlet-passage is controlled by a valve $f$, which is guided by projections $f^2$ above the valve-seat $d^3$. (See Fig. 3.) The said valve $f$ may be operated by any of the various contrivances employed for opening and closing a valve according as a condensed liquid rises and falls or displaces and is displaced by the non-condensed or elastic fluid or vapor. As shown in this instance, the piston $d$ is provided with uprights $g$ (see Fig. 3) that support a ring or annulus $h$, which in turn supports a diaphragm or flexible partition $i$, forming one wall of a chamber $k$, that is fixed to said annulus $h$, and contains a liquid or other material that expands and contracts readily on changes in temperature. The stem of the valve $f$ rests against the said diaphragm $i$ and is acted upon by a spring $m$ which tends to raise and open the valve as the diaphragm $i$ yields upon contraction of the contents of the chamber $k$, but which is overcome when the contents of the said chamber expands under the action of a rise in temperature, which thus causes the valve $f$ to close.

Naphtha or some of the volatile hydrocarbon fluids or mixtures thereof may be used in the chamber $k$ to operate the diaphragm and valve.

The operation of these parts is as follows: As long as steam is in the reservoir $a^5$, around the chamber $k$, or devices responsive to change of condition of the surrounding fluid—i. e., the rise and fall of the condensed liquid—the contents of said chamber will be sufficiently expanded to keep the valve closed and there will be practically no outlet from the supplied passages of the main reducing-valve. When, however, the condensed liquid collects and rises sufficiently to cover the sensitive material in the chamber $k$ the latter is protected from the heat of the uncondensed steam, and the water of condensation, after covering the said chamber, is already or soon becomes sufficiently cooled to permit contraction of the material in said chamber and consequent opening of the valve $f$ by its spring $m$, when the liquid will be expelled through the passage in the piston $d$, and the steam will again surround the responsive device $k$, which will respond to such condition and cause the valve $f$ to close as before, so that no steam will be permitted to escape. The valve-seat $d^3$ is slightly above the upper surface of the piston $d$, so that even if the valve $f$ does not respond immediately after the level of the liquid passes below the responsive device $k$ there will always be left a slight amount of liquid above the piston which serves as a sufficient packing to prevent the escape of steam around the piston, which, as before stated, is not packed. It is tight enough, however, to prevent the escape of liquid with any great rapidity—that is, the escape around the piston should always be less than the normal rate of accumulation from the condensation of the liquid, so that although the liquid may always be leaking around the piston $d$ it never, while the apparatus is in operation, wholly uncovers said piston, so as to permit leakage of steam.

The seat-piece $d^4$ may be adjusted relative to the chamber $k$ by turning the stem $d^5$ so as to make the valve $f$ respond properly to the action of the chamber $k$ and material therein.

It will be seen that the operation of the apparatus in each of its functions does not interfere with its operation for the other function—that is, the piston $d$ with all the parts supported on it constituting the operative parts of the trap may rise and fall to control the main valve $b$ without at all interfering with the action of the said operative parts of the trap, although the parts constituting the trap are mechanically combined with the valve so as to constitute practically a single instrument having both functions.

Such combined instrument besides being less expensive than two separate instruments for performing the two desired operations is more effective and desirable for various other reasons, among which may be mentioned the following: The water packing for the piston $d$ is an advantage, as it affords great freedom of movement to said piston, which also operates to a certain extent like a dash-pot to prevent too great suddenness of movement of the said piston and main valve $b$. Further than this by having the trap-reservoir integral or intimately connected with the valve it is kept sufficiently heated after the steam is cut off from the inlet-pipe and the apparatus is thrown out of operation to prevent freezing, as whatever water may remain at such time above the piston $d$ will have time to leak out around said piston before the instrument cools to the freezing-point, and even if ice should form in the trap portion it would be melted by the flow of steam through the valve when the steam was next turned on before it would be necessary for the trap-valve to operate.

The parts are constructed so that all the adjustment required may be made with an ordinary monkey-wrench and the entire instrument may be very easily taken to pieces. Thus by unscrewing the head $e^2$ the spring $e$ and the piston $d$ and the parts connected with it may be immediately removed from the apparatus, and by unscrewing the cap $c^2$ the spring $c$ and main valve $b$ may be removed, thus leaving only the one casting or shell connected with the piping. The seat $d^4$ may then be unscrewed from the valve $d$ and the valve $f$ and its spring may then be withdrawn and repaired or replaced, if need be.

The invention is not limited, however, to the specific construction of the various parts, as it is obvious that they may be varied and that other devices having substantially the same functions may be substituted for the elements shown without materially changing the operation of the combined elements, and while steam has been spoken of as the fluid to be controlled by the valve and trap it is obvious that the apparatus would operate with other fluids, being applicable to any apparatus in which it is desired to regulate the pressure of fluid and also to separate fluid in the liquid form from fluid in the gaseous form.

I claim—

1. The combination of a main valve shell having inlet and outlet openings; and a main valve governing the passage of fluid from one to the other of said openings; with a collecting chamber or reservoir connected with and located below said valve shell; a piston working in said collecting chamber and provided with an outlet passage through said piston; a valve controlling said outlet passage; and means, such for example as a diaphragm chamber and volatile fluid therein, for actuating said valve, controlled by the rise and fall of liquid in said reservoir, substantially as and for the purpose described.

2. The combination of the main shell having inlet and outlet openings, and main valve governing the passage of fluid from one to the other of said openings, with a collecting chamber or reservoir and piston therein, adapted to operate said main valve, said piston being exposed to the pressure of the fluid delivered through said main valve and acted upon by a spring in opposition to said pressure, and said reservoir having an outlet and a valve controlling said outlet, and means contained in said reservoir, such for example as a diaphragm chamber and volatile fluid therein, for actuating the same controlled by the rise and fall of liquid in said reservoir, substantially as described.

3. The combination of a main valve shell having inlet and outlet openings and a main valve governing the passage of fluid from one to the other of said openings, with a collecting chamber or reservoir connected with and located below the said valve shell, a piston working in said collecting chamber and provided with a passage through said piston, and with a valve seat, a valve controlling said passage in the piston, and a diaphragm chamber supported on said piston containing a liquid expansible by heat for operating the said valve by the movement of said diaphragm according as said chamber is surrounded by liquid or non-condensed fluid, said piston and connected parts cooperating with the main valve, substantially as described.

4. The combination of a main valve shell having inlet and outlet openings and a main valve governing the passage of fluid from one to the other of said openings with a collecting chamber or reservoir connected with and located below the said valve shell, a piston working in said collecting chamber and provided with a passage through said piston, and seat piece longitudinally adjustable in said passage, and valve cooperating with the seat thereof and means for actuating said valve, substantially as described.

5. The combination of a main valve shell having inlet and outlet openings and a main valve governing the passage of fluid from one to the other of said openings with a collecting chamber or reservoir connected with and located below the said valve shell, a piston working in said collecting chamber and provided with a passage through said piston, and seat piece longitudinally adjustable in said passage, and valve cooperating with the seat thereof and means for actuating said valve; a spring below said piston and adjustable support therefor, at the end of the collecting chamber, said support having a discharge passage and the seat piece in the piston having a stem extending through said discharge passage, substantially as described.

In testimony whereof I have signed my name to this specification in the presence of two subscribing witnesses.

WM. B. MASON.

Witnesses:
JOHN H. MORISON,
JAS. J. MALONEY.